United States Patent
Golden et al.

(10) Patent No.: US 9,989,030 B2
(45) Date of Patent: Jun. 5, 2018

(54) FLUID POWERED STARTER WITH A VARIABLE TURBINE STATOR

(71) Applicant: Ingersoll-Rand Company, Davidson, NC (US)

(72) Inventors: Hunter Golden, Cary, NC (US); Steven Diacumakos, Apex, NC (US); Warren Seith, Bethlehem, NC (US)

(73) Assignee: Ingersoll-Rand Company, Davidson, NC (US)

( * ) Notice: Subject to any disclaimer, the term of this patent is extended or adjusted under 35 U.S.C. 154(b) by 494 days.

(21) Appl. No.: 14/667,386

(22) Filed: Mar. 24, 2015

(65) Prior Publication Data

US 2016/0281668 A1    Sep. 29, 2016

(51) Int. Cl.

| F01D 17/14 | (2006.01) |
|---|---|
| F02N 7/08 | (2006.01) |
| F02C 7/277 | (2006.01) |
| F01D 9/02 | (2006.01) |
| F01D 17/00 | (2006.01) |
| F01D 17/12 | (2006.01) |
| F01D 17/16 | (2006.01) |
| F01D 9/00 | (2006.01) |
| F01D 17/10 | (2006.01) |
| F01D 9/04 | (2006.01) |

(52) U.S. Cl.
CPC .............. *F02N 7/08* (2013.01); *F01D 9/041* (2013.01); *F01D 17/141* (2013.01); *F01D 17/162* (2013.01); *F02C 7/277* (2013.01); *F01D 9/00* (2013.01); *F01D 9/02* (2013.01); *F01D 9/04* (2013.01); *F01D 17/00* (2013.01); *F01D 17/10* (2013.01); *F01D 17/12* (2013.01); *F01D 17/14* (2013.01); *F01D 17/16* (2013.01); *F05D 2260/85* (2013.01)

(58) Field of Classification Search
CPC ..... F01D 9/00; F01D 9/02; F01D 9/04; F01D 9/041; F01D 17/00; F01D 17/10; F01D 17/12; F01D 17/14; F01D 17/141; F01D 17/16; F02N 7/08
See application file for complete search history.

(56) References Cited

U.S. PATENT DOCUMENTS

| 2,531,896 A | * | 11/1950 | Telbizoff | ............... | F01D 17/141 |
| | | | | | 138/46 |
| 2,565,178 A | * | 8/1951 | Imbert | .................. | F01D 17/141 |
| | | | | | 415/126 |

(Continued)

FOREIGN PATENT DOCUMENTS

| EP | 0493627 A1 | 7/1992 |
| WO | 200123724 A2 | 4/2001 |

OTHER PUBLICATIONS

European Patent Office Extended European Search Report dated Aug. 8, 2016 cited in counterpart EP Application No. 16161608.1, filed Mar. 22, 2016 (7 pages).

*Primary Examiner* — Justin Seabe
*Assistant Examiner* — Behnoush Haghighian
(74) *Attorney, Agent, or Firm* — Taft, Stettinius & Hollister LLP (57) ABSTRACT

A system for starting an engine is disclosed herein. The system includes a fluid powered turbine with a variable geometry stator. The variable geometry stator includes moveable members operable to selectively block fluid flow to the turbine.

30 Claims, 5 Drawing Sheets

(56) References Cited

U.S. PATENT DOCUMENTS

| | | | |
|---|---|---|---|
| 2,825,531 A * | 3/1958 | Holt | F01D 17/141 |
| | | | 415/10 |
| 3,849,021 A | 11/1974 | Eastman et al. | |
| 4,177,024 A | 12/1979 | Lohn | |
| 5,125,597 A | 6/1992 | Coffinberry | |
| 6,328,526 B1 | 12/2001 | Seki et al. | |
| 7,607,318 B2 | 10/2009 | Lui et al. | |
| 7,628,580 B2 | 12/2009 | Parker et al. | |
| 8,172,516 B2 | 5/2012 | Parker et al. | |
| 2012/0328426 A1 | 12/2012 | Zawilinski et al. | |
| 2013/0039736 A1 | 2/2013 | Waugh et al. | |
| 2013/0145753 A1 | 6/2013 | Becker et al. | |

* cited by examiner

FLUID POWERED STARTER WITH A VARIABLE TURBINE STATOR

TECHNICAL FIELD

The present invention generally relates to a fluid powered turbine starter and more particularly, but not exclusively to a fluid powered starter with a variable geometry turbine stator.

BACKGROUND

Fluid powered turbine starters can be used to start engines such as for example diesel, spark ignited or gas turbine engines. Fluid powered starters use compressed fluid such as air to rotatingly drive a vaned rotor (turbine) which in turn is connected via one or more gears to an engine ring gear or starter gear. Fluid powered starters can be optimized to run at a predetermined design pressure. In some applications controlling the fluid pressure delivered from a compression source is difficult or unpractical from a cost or system complexity standpoint. Some existing starter systems have various shortcomings relative to certain applications. Accordingly, there remains a need for further contributions in this area of technology.

SUMMARY

One embodiment of the present invention includes a fluid powered starter with a unique variable geometry stator. A variable geometry turbine stator can control the fluid pressure entering the turbine from a range of compression sources and fluid pressures. Other embodiments include apparatuses, systems, devices, hardware, methods, and combinations for fluid powered starter systems with unique variable geometry stators are disclosed herein. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Engine starter systems driven by compressed fluid can be used to start a variety of types and sizes of engines. These engines can include internal combustion engines or gas turbine engines used for a variety of applications such as, for example large commercial vehicles, industrial facilities or water based vessels. Engine size is not limited with the starter system disclosed in the present application and can range from tens to thousands of horsepower. The term "fluid" should be understood to include any gas or liquid medium that can be used in the compressor system as disclosed herein. It should also be understood that air is a typical working fluid, but different fluids or mixtures of fluid constituents can be used and remain within the teachings of the present disclosure, therefore terms such as fluid, air, compressible gas, etc., are used interchangeably in the present patent application. For example, in some embodiments it is contemplated that a hydrocarbon gaseous fuel including natural gas and propane, or inert gasses including nitrogen and argon may be used as a primary working fluid.

Fluid powered turbine starters are designed to operate at certain predefined working fluid pressures so that structural loading and rotational speeds remain within threshold design limits during operation. The present application includes embodiments of fluid powered turbine starters that can be used with a variety of compression systems operating across a range of pressures because the working fluid pressure entering the turbine of the starter can be controlled with a variable geometry turbine stator.

Figure 1:
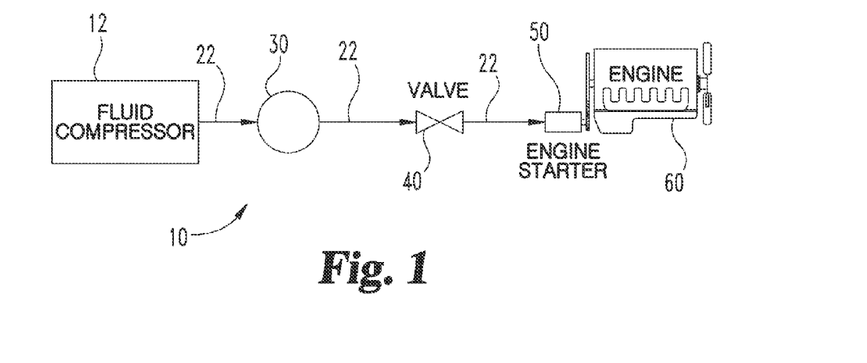
FIG. 1 is a schematic view of an exemplary engine starter system.

Referring now to FIG. 1, a portion of an engine starter system 10 is illustrated in schematic form. A compressed working fluid illustrated by arrow 22 can be generated by a fluid compressor 12 to a desired flow rate and pressure. The compressed working fluid 22 can include various constituencies including air, water, oil, or other desirable constituents and/or undesirable contaminants. The engine starter system 10 can include an optional compressed fluid storage tank 30 and one or more valves 40 such as shut off and lubricator valves for certain applications. An engine starter 50 receives a compressed fluid flow and is configured to rotatingly drive an engine 60 to a starting rotational speed.

Figure 2:
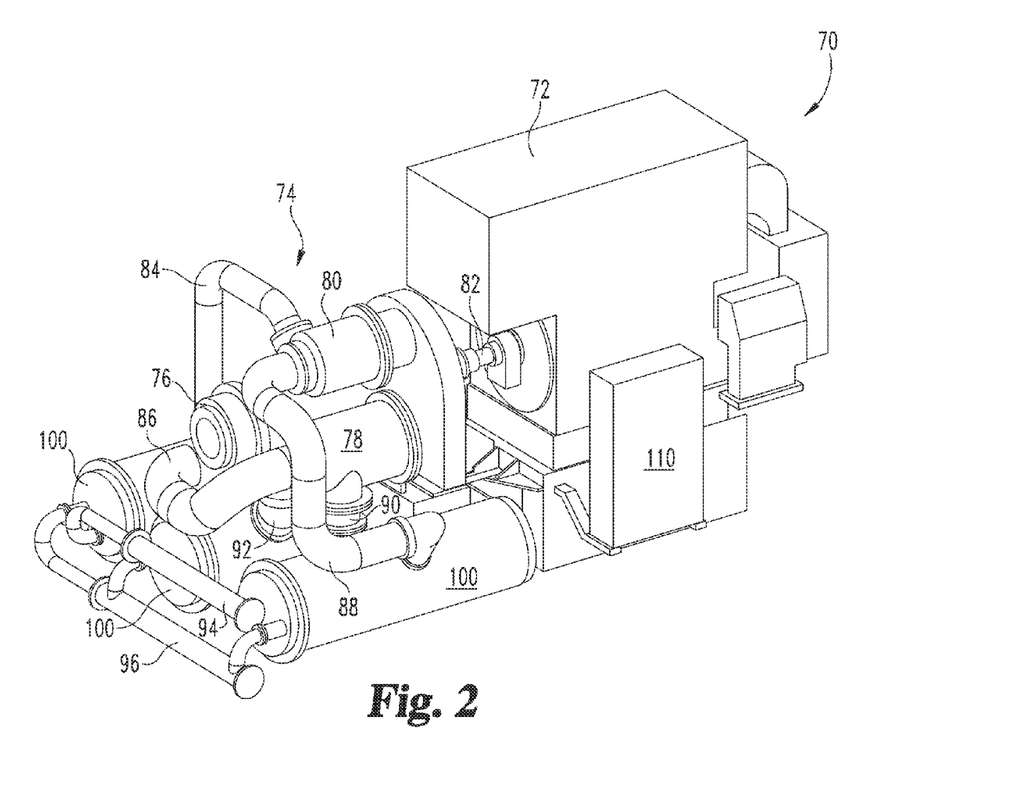
FIG. 2 is a perspective view of an exemplary compressor system that may be used in one embodiment of the present disclosure.

Referring now to FIG. 2, an exemplary compressor system 70 can be used with the engine starter system 10 as defined in the present application. The compressor system 70 includes a primary motive source 72 such as an electric motor or an internal combustion engine and the like. The compressor system 70 can include a compressor 74 with multi-stage compression and in the exemplary embodiment includes a first stage compressor 76, a second stage compressor 78, and a third stage compressor 80. In other embodiments a different number of compressor stages may be employed with the compressor 70. The compressor 70 can include centrifugal, axial and/or positive displacement compression means. The primary motive source 72 is operable for driving the compressor 70 via a drive shaft 82 to compress fluids such as air, natural gas, propane or the like.

Portions of the compressed air discharged from the compressor 74 can be transported through more one or more conduits 84, 86, 88, 90 and 92 to one or more intercoolers 100 and/or to another compressor stage. An inlet fluid manifold 94 and an outlet fluid manifold 96 can be fluidly connected to the intercoolers 100 to provide cooling fluid such as water or other liquid coolant to cool the compressed air after discharge from one or more of the compressor stages of the compressor 74. The compressor system 70 can also include a controller 110 operable for controlling the primary motive power source and various valving and fluid control mechanisms (not shown) between the compressor 74 and intercoolers 100. The compressor system of FIG. 1 is only one exemplary form of a compressor system that can be used with the teachings of the present disclosure. Other forms and configurations are also contemplated herein. For example, portable compressor systems or compressor systems that are mounted onto engines for industrial operation, land vehicle operation, or water vessel operation can be used with the engine starter system 10 described herein.

Figure 3:
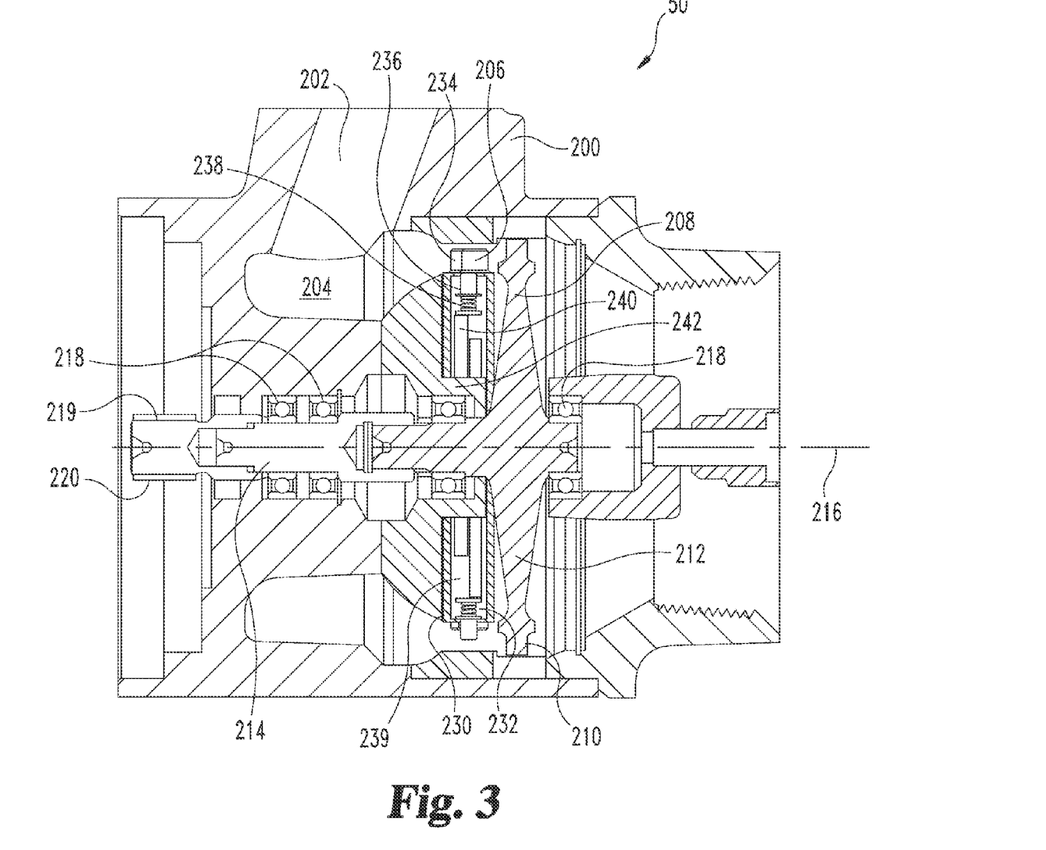
FIG. 3 is a cross sectional view of a portion of a turbine starter with a variable geometry stator according to one exemplary embodiment of the present disclosure.

Referring now to FIG. 3 a turbine engine starter 50 is illustrated in cross-sectional form. The turbine engine starter 50 includes a housing 200 having a fluid inlet 202 to deliver a compressed fluid to an annular flow path 204 that can form a circular pattern within the housing 200. The annular flow path 204 is in fluid communication with a stator 206 that is generally fixed in position relative to the housing 200. In some forms one or more portions of the stator 206 are movable or include variable geometry as will be described more fully below. The stator 206 directs the compressed fluid to a turbine 208 that is rotatably coupled to the housing 200. The turbine 208 includes a plurality of turbine blades 210 that extend radially outward from a turbine disk 212. A turbine shaft 214 extends from the turbine disk 212 along an axial direction defined by axis 216. The turbine 208 is rotatably supported in the housing 200 by one or more bearing assemblies 218 that are operably coupled between the shaft 214 and portions of the housing 200. At a distal end 219 of the turbine shaft 214, a gear or a splined sleeve 220 or the like can be positioned therewith so as to operably couple to other gears (not shown) of a gearbox or directly to an engine gear (also not shown) so that rotation of the turbine causes an engine to rotate to a starting rotational speed. The stator 206 is operable for controlling a flow rate and pressure of the compressed flow that passes through the turbine blades 210 of the turbine 208. The speed of turbine rotation is directly proportional to the velocity and pressure of the pressurized flow of working fluid.

In one exemplary embodiment illustrated in FIG. 3 the stator 206 can include a stator body 230 having a hollow cavity 232 formed therein. A plurality of fixed stator vanes 234 can be positioned around the stator body 230 as is conventional and known by those skilled in the art. A plurality of flow blocking members such as for example slidable pins 236 can be positioned between adjacent pairs of the fixed stator vanes 234 so as to selectively block compressed fluid flow to the turbine 208. In some forms the flow blocking members 236 may be positioned forward or upstream of the stator vanes 234. In other forms, the flow blocking members 236 may be positioned aft or downstream of the stator vanes 234. The blocking members 236 can be coupled within a resilient member such as a coil spring 238 in a manner that urges the blocking members 236 in a radially outward direction. In other embodiments a resilient member may be operable to move the blocking members 236 radially inward. An actuation system 239 is configured to move the blocking members 236 between first and second positions. In one exemplary embodiment the actuation system can include one or more rotatable cams 240 that are selectively engageable with the plurality of slidable blocking members 236. The actuation system 239 can also include one or more actuation members 242 such as hydraulic or electrical actuators that move in a linear and/or rotational direction as will be described in more detail below.

Figure 4:
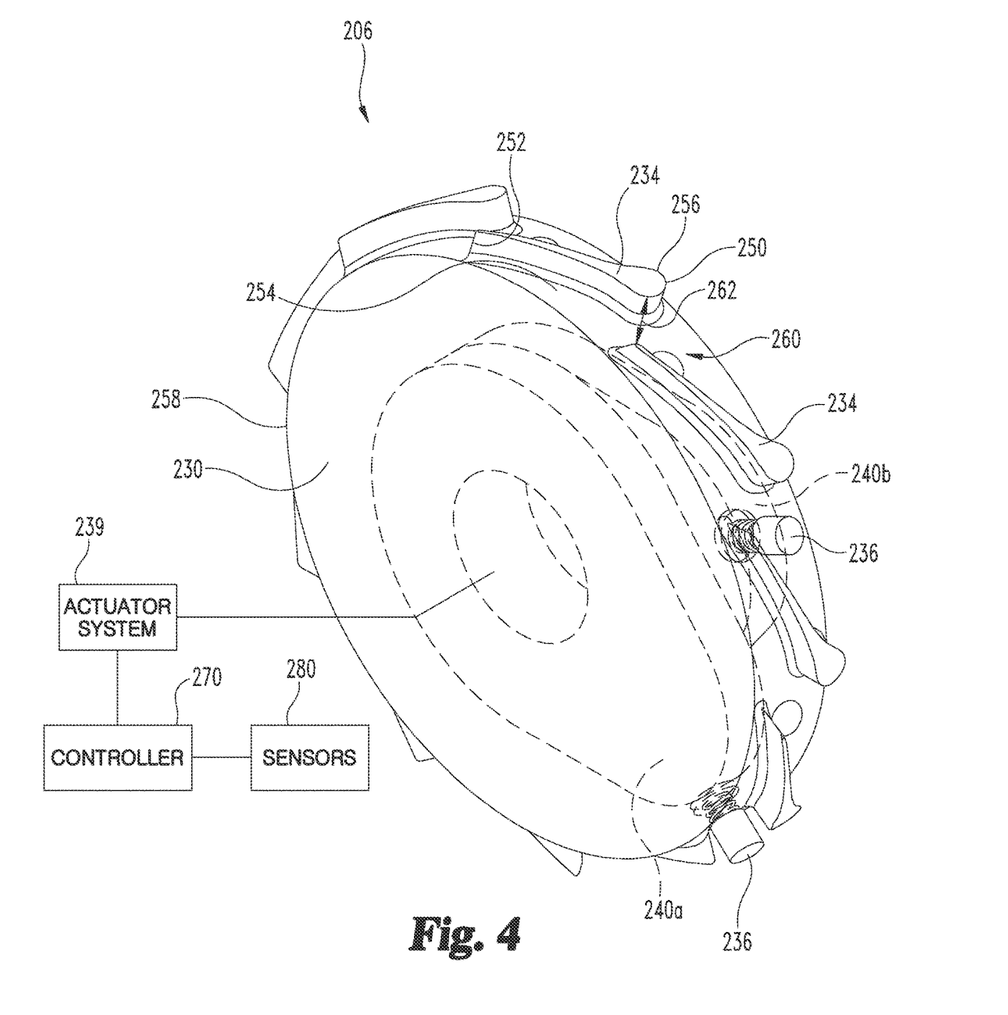
FIG. 4 is a perspective view of a variable geometry stator with an illustrative schematic view of an exemplary cam actuation system according to one exemplary embodiment of the present disclosure.

Referring now to FIG. 4, the turbine stator 206 is shown schematically in a perspective view. A plurality of stator vanes 234 extend radially outward from the stator body 230 so as to provide a guided flow path for compressed air to flow through. One or more flow blocking members such as pins 236 can be positioned between adjacent pairs of stator vanes 234. A pair of rotatable cam members 240a, 240b are shown in phantom as illustrative examples of one actuation device wherein a cam can engage with and urge one or more blocking members 236 to move from a first position that is radially inward to a second position that is radially outward. The stator vanes 234 extend between a leading edge 250 and a trailing edge 252 along a flow direction and between a hub 254 and a tip 256 in a radial direction. The stator includes an outer perimeter 258 positioned around the body 230 and corresponds to a radial position of the stator hub 254.

A flow area 260 is formed between adjacent pairs of stator vanes 234. The flow area 260 is defined by a width illustrated by double arrow 262 between two adjacent stator vanes 234 and a height that is defined by the distance between the hub 254 and the tip 256 of each stator vanes 234. The blocking members 236 can be fully retracted in a radially inward direction such that in a first position the flow area 260 is unimpeded and completely open or alternatively the flow blocking member 236 can be fully extended to a second position that corresponds to approximately the same height of each stator vane defined by the tip 256. In this position the flow blocking member 236 can block or impede substantially all of the compressed fluid flow through a corresponding flow area 260. Each blocking member 236 can be positioned anywhere between the first and second positions so as to block a desired amount of flow to the turbine 208. In one form, when the flow blocking member 236 is at the second position, the entire flow area 260 is completely blocked such that substantially no compressed fluid flow can flow between the adjacent stator vanes 234. In alternative embodiments, when the flow blocking member 236 is fully extended to the second position, a predefined amount of compressed fluid flow may pass through the flow area 260 as desired.

The size, shape, cross sectional configuration, axial position and number of blocking members 236 can vary in different embodiments of the present disclosure. For example, the illustrative embodiment shows blocking members 236 with substantially circular shaped cross sections positioned between each adjacent pair of vanes 234. However, in other embodiments, the cross sectional shapes may include airfoil shapes, rectangular shapes or even substantially flat plate configurations.

Furthermore, the blocking members 236 may be positioned axially forward or aft of the vanes 234 and may extend across two or more flow areas 26 to selectively block working fluid flow through two or more adjacent pairs of vanes 234.

An electronic controller 270 can be operably coupled to one or more sensors 280 such as pressure sensors, temperature sensors, mass flow sensors and/or speed sensors of the turbine so as to provide a desired flow blockage based on predefined parameter values. The controller 270 can be operably connected to the actuator system 239 so that each of the flow blocking members 236 can be positioned at a location so as to deliver the desired fluid flow rate to the turbine 208. In one form the flow blocking members 236 can each be controlled such that each are located in substantially the same radial position and in other forms each of the flow blocking members 236 can be positioned independently of the other flow blocking members of the stator 206.

In some embodiments, an active electronic controller 270 may not be utilized and instead a passive actuation system 239 can be utilized. In one nonlimiting example, the stator 206 may be pivotably coupled to the housing 200 such that fluid flow through the vanes 234 causes the stator 206 to pivot at an angular distance proportional to the pressure and/or mass flow rate of the compressed fluid. A cam system can engage with the flow blocking members 236 as the stator 206 pivots due to the force of the working fluid acting on the vanes causing the flow blocking members 236 to move radially inward or outward relative to stator 206 as the stator pivots relative to one or more cams. Various forms of resilient members (not shown) may be used with a passive actuation system 239 to urge the stator or cam to a first position corresponding to either a fully blocked or fully unblocked position as would be known to those skilled in the art.

Figure 5:
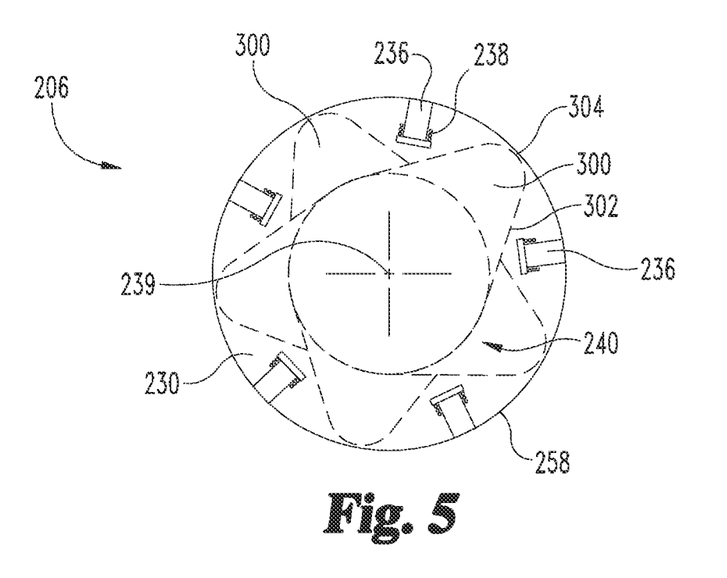
FIG. 5 is a schematic view of a variable geometry stator with an actuator system in a first position according to one exemplary embodiment of the present disclosure.

Referring now to FIG. 5 a schematic illustration of a portion of a turbine stator 206 is depicted therein. In this example, each of the flow blocking members 236 are in a first position wherein each are fully retracted radially inward from the outer perimeter 258 of the stator body 230 so that there is minimal or no flow blockage between the stator vanes (not shown). A resilient member 238 coupled to each blocking member 236 can fully retract the blocking members 236 when an actuation force is removed from engagement with the blocking members 236. In this exemplary embodiment a plurality of cam lobes 300 can include a ramp angle 302 that terminates at a cam tip 304. The actuation system 239 has positioned the cam 240 in a location such that the blocking members 236 are located in the first position.

Figure 6:
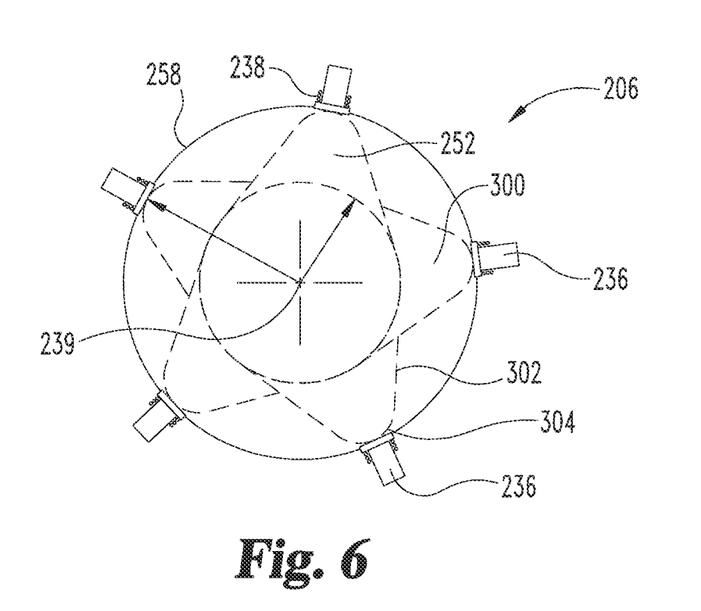
FIG. 6 is a schematic view of the variable geometry stator of FIG. 5 with the actuator system in a second position according to one exemplary embodiment of the present disclosure.

Referring now to FIG. 6 the actuator system 239 has rotated the cam members 240 to a position wherein the tips 304 of the cam lobes 300 are engaged with the blocking members 236 so as to move the blocking members 236 to the second position corresponding to a fully extracted radially outward location. In this position, the blocking members 236 provide a maximum flow blockage of the flow area between the vanes (not shown). In some forms the maximum flow blockage is essentially complete flow blockage between adjacent vanes and in other embodiments the maximum flow blockage provides for a minimal desired amount of fluid flow to the downstream turbine. While the exemplary embodiments shown in FIG. 5 and FIG. 6, show the flow blocking members 236 in a fully retracted or a fully extracted position, it should be understood that the flow blocking members 236 can be positioned at any location there between, such that a portion of working flow between a minimum amount and a maximum amount may be permitted to flow to the turbine 208. Furthermore, as explained above, the blocking members 236 can be individually controlled such that they are independently positioned anywhere between the first position and the second position as desired.

Figure 7:
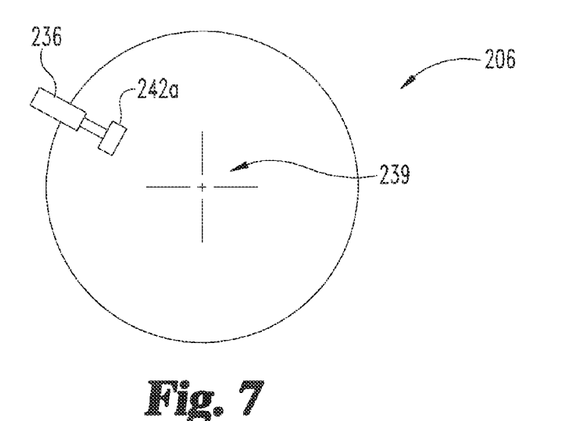
FIG. 7 is a schematic view of a portion of a variable geometry stator showing an individual electronic linear actuator engageable with a flow blocking member.

Referring now to FIG. 7, an illustrative example of another actuation system 239 wherein an individual linear actuator 242a can engage and actuate an individual blocking member 236. In this embodiment a plurality of individual actuators can engage with corresponding blocking members 236 to provide individual control of each blocking member 236. In alternative embodiments a plurality of cams having a plurality of cam lobes can also provide for individual control of each the blocking members 236 such that the blocking members can be positioned at different locations between the first and second positions independent from one another.

Figure 8:
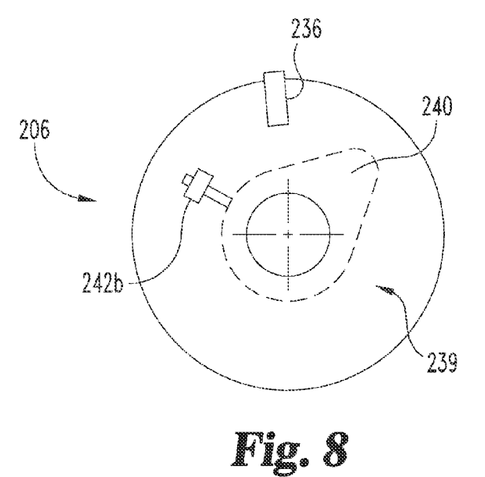
FIG. 8 is a schematic view of a variable geometry stator similar to FIG. 7 wherein a linear electronic actuator is coupled to a rotatable cam.

Referring now to FIG. 8 another exemplary embodiment of an actuator system 239 is shown, wherein a linear actuator 242b is coupled to one or more cams and/or one or more intermediate gears (not shown) as would be understood by one skilled in the art. In this manner individual blocking members 236 can be controlled together or separately depending on the cam assembly configuration as the linear actuator 242b moves the rotatable cam 240.

Figure 9:
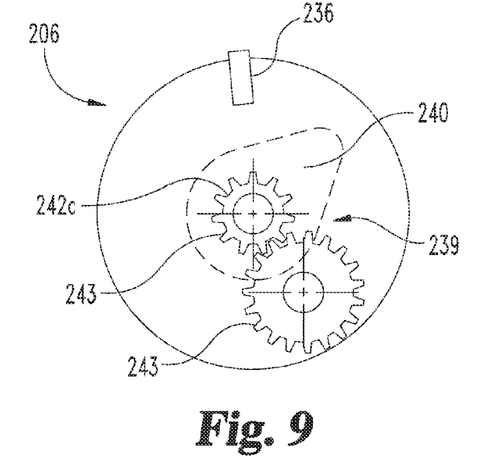
FIG. 9 is a schematic representation of a rotatable actuator operable with a rotatable cam.

Referring now to FIG. 9 yet another embodiment of an actuation system 239 is illustrated. In this nonlimiting example, an individual rotatable electronic actuator 242c can be coupled to one or more gears 243 or the like so as to transmit rotational force directly into a rotatable actuation member such as a cam 240.

In operation the engine starter system 10 is configured to provide compressed working fluid such as air at a desired temperature and pressure to an engine starter 50 for starting an engine 60. The engine starter system can be used in any industrial application including, but not limited to manufacturing, process industries, refineries, power plants, mining, operations and material handling, etc. An actuation system can be defined by a number of different configurations, some of which have been described herein. Other actuation system means as would be known to those skilled in the art, should be presumed as falling within the teachings of the present application. Material selection for components within the fluid power starter can include metals, plastics, composites or combinations thereof. Furthermore, various coatings may be used to promote resistance to oxidation and corrosion and/or to facilitate reduction of friction or increased antifretting properties as would be known to those skilled in the art.

In one aspect, the present disclosure includes a system comprising: a source of compressed working fluid; a turbine starter including: a housing; a turbine rotatably supported within the housing, the turbine having a plurality of vanes extending radially outward from a turbine disk; a variable geometry stator positioned upstream of the turbine, the stator having a plurality of static vanes extending radially outward from a stator body and a plurality flow areas defined between adjacent pairs of vanes; and wherein the variable geometry stator is configured to block a variable portion of one or more of the flow areas of the stator.

In refining aspects, the present disclosure includes a system wherein the variable geometry stator is operable to control flow rate of the working fluid discharged to the turbine; the variable geometry stator is operable to block a different portion of each of the plurality of flow areas; the variable geometry stator is operable to block an equal portion of each of the plurality of flow areas; the variable geometry stator is operable to block each of the flow areas from 0% to 100%; further comprising an actuation system operably coupled to the variable geometry stator; where the actuation system includes a rotatable cam; wherein the rotatable cam includes a plurality of separately rotatable cams; where in each rotatable cam includes at least one actuation lobe; wherein the actuation system includes at least one of a linear and/or a rotational electronic actuator; further comprising a plurality of blocking member moveable between first and second positions corresponding to a fully open flow area and a fully closed flow area respectively between adjacent pairs of vanes; wherein the blocking members are positioned upstream of the vanes, downstream of the vanes, or between the vanes; wherein the blocking members include a pin positioned between an adjacent pair of stator vanes, the pin having a width substantially equivalent to a distance between the adjacent stator vanes; wherein each blocking member includes a structure extending across flow areas of at least two adjacent pairs of stator vanes; comprising a resilient member engaged with the blocking member to urge the blocking member toward one of the first and second positions; further comprising at least one of a controller, a temperature sensor, a pressure sensor and a speed sensor adapted to control the turbine starter during an engine star process.

In another aspect, the present disclosure includes a turbine starting comprising: a housing having a fluid inlet and a fluid outlet; a variable geometry stator having a plurality of stator vanes extending radially outward therefrom, the stator positioned within the housing downstream of the fluid inlet; a stator flow area defined between each pair of adjacent stator vanes; a movable member positioned to selectively block one or more of the stator flow areas; and a turbine rotatably supported within the housing downstream of the stator.

In refining aspects, the present disclosure includes a turbine starter wherein the movable member is positioned upstream of the stator vanes, downstream of the vanes, or between the vanes; further comprising an actuation system coupled to the movable member, the actuation system operable for moving the movable member between first and second positions corresponding to a fully open flow area and a fully closed flow area, respectively; wherein the actuation system includes a rotatable cam with at least one actuation lobe operably engageable with the movable member; wherein the actuation system includes at least one of a linear and a rotatable electronic actuator; wherein the electronic actuator is operably coupled to a cam; wherein the electronic actuator is operably coupled directly to the movable member; wherein the moveable member includes a plurality of moveable members and each moveable member operates independently from other moveable members; wherein the stator housing is adapted to pivot about a rotational axis to react against fluid flow; and wherein the movable member is adapted to move between first and second positions in response to the pivoting of the stator housing.

In another aspect, the present disclosure includes a turbine stator comprising: a body with a cavity formed between a hub and an outer perimeter; a plurality of static airfoil shaped vanes extending radially outward from the outer perimeter; a flow area defined between adjacent vanes; a flow blocking member positioned between adjacent vanes, the flow blocking member movable between first and second positions, wherein the first and second positions corresponds to variably defined blockages of the flow area; and an actuation device operably coupled to the flow blocking member to urge the flow blocking member toward one of the first and second positions when activated.

In refining aspects, the present disclosure includes a turbine stator wherein the actuation device is at least partially disposed in the cavity; wherein the actuation device includes a cam; wherein the flow blocking device includes a structure slidable between the first and second positions corresponding to fully open and fully closed positions respectively; and further comprising a resilient member coupled to the slidable structure to urge the pin toward the other of the first and second positions when the actuation device is deactivated.

In another aspect, the present disclosure includes a method comprising transporting pressurized working fluid to a variable geometry turbine stator; controlling the pressurized working fluid discharged from the turbine stator, wherein the controlling includes selectively blocking a portion of the flow of working fluid through flow areas formed between static vanes of the stator; rotatingly driving a turbine with the working fluid; and rotating an engine to a starting speed with the turbine.

In refining aspects, the present disclosure includes a method further comprising sensing a pressure of a working fluid, a temperature of the working fluid and/or the speed of the turbine; wherein the controlling is in response to the sensing; wherein the controlling includes moving a flow blocking member to a desired position between a first position proximate to a hub of the stator vanes to a second position proximate the tip of the stator vanes.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system comprising:
 a source of compressed working fluid;
 a turbine starter including:
 a housing;
 a turbine rotatably supported within the housing, the turbine having a plurality of vanes extending radially outward from a turbine disk;
 a variable geometry stator positioned upstream of the turbine, the stator having a plurality of static stator vanes extending radially outward from a stator body and a plurality flow areas defined between adjacent pairs of stator vanes, wherein the variable geometry stator is configured to block a variable portion of one or more of the flow areas of the stator;
 an actuation system operably coupled to the variable geometry stator; and
 wherein the actuation system includes a cam positioned within the stator body.

2. The system of claim 1, wherein the variable geometry stator is operable to control flow rate of the working fluid discharged to the turbine.

3. The system of claim 1, wherein the variable geometry stator is operable to block a different portion of each of the plurality of flow areas at the same time.

4. The system of claim 1, wherein the variable geometry stator is operable to block an equal portion of each of the plurality of flow areas at the same time.

5. The system of claim 1, wherein the variable geometry stator is operable to variably block each of the flow areas between the stator vanes from 0% to 100%.

6. The system of claim 1, wherein the cam is a rotatable cam.

7. The system of claim 6, wherein the rotatable cam includes a plurality of separately rotatable cams.

8. The system of claim 7, wherein each rotatable cam includes at least one actuation lobe.

9. The system of claim 1, wherein the actuation system includes at least one of a linear electronic actuator and/or a rotational electronic actuator.

10. The system of claim 1, further comprising a plurality of blocking members moveable between first and second positions corresponding to a fully open flow area and a fully closed flow area respectively between adjacent pairs of stator vanes.

11. The system of claim 10, wherein the blocking members are positioned upstream of the stator vanes, downstream of the stator vanes, or between the stator vanes.

12. The system of claim 10, wherein the blocking members include a pin positioned between an adjacent pair of stator vanes, the pin having a width substantially equivalent to a distance across a space between the adjacent stator vanes.

13. The system of claim 10, wherein each blocking member extends across flow areas of at least two adjacent pairs of stator vanes.

14. The system of claim 10, further comprising a resilient member engaged with each of the blocking members to urge the blocking members toward the first position.

15. The system of claim 1, further comprising at least one of a controller, a temperature sensor, a pressure sensor and a speed sensor adapted to control the turbine starter during an engine start process.

16. A turbine starter comprising:
a housing having a fluid inlet and a fluid outlet;
a variable geometry stator having a plurality of stator vanes extending radially outward therefrom, the stator positioned within the housing downstream of the fluid inlet;
a stator flow area defined between each pair of adjacent stator vanes;
a movable member positioned to selectively block one or more of the stator flow areas; and
a turbine rotatably supported within the housing downstream of the stator; and
an actuation system having a cam positioned within the stator and coupled to the movable member, the actuation system operable for moving the movable member between first and second positions corresponding to a fully open flow area and a fully closed flow area, respectively.

17. The turbine starter of claim 16, wherein the movable member is positioned upstream of the stator vanes, downstream of the vanes, or between the vanes.

18. The turbine starter of claim 16, wherein the cam is a rotatable cam with at least one actuation lobe operably engageable with the movable member.

19. The turbine starter of claim 16, wherein the actuation system includes at least one of a linear and a rotatable electronic actuator.

20. The combination valve of claim 19, wherein the electronic actuator is operably coupled to the cam.

21. The turbine starter of claim 19, wherein the electronic actuator is operably coupled directly to the movable member.

22. The turbine starter of claim 16, wherein the moveable member includes a plurality of moveable members and each movable member operates independently from other moveable members.

23. The turbine starter of claim 16, wherein the stator includes a housing adapted to pivot about a rotational axis to react against fluid flow.

24. The turbine starter of claim 23, wherein the movable member is adapted to move between first and second positions in response to the pivoting of the stator housing.

25. A turbine stator comprising:
a body with a cavity formed between a hub and an outer perimeter;
a plurality of static airfoil shaped vanes extending radially outward from the outer perimeter;
a flow area defined between adjacent vanes;
a flow blocking member positioned between adjacent vanes, the flow blocking member movable between first and second positions, wherein the first and second positions corresponds to variably defined blockages of the flow area; and
an actuation device operably coupled to the flow blocking member to urge the flow blocking member toward one of the first and second positions when activated; and
wherein the actuation device includes a cam disposed in the cavity of the body.

26. The turbine stator of claim 25, wherein the flow blocking device includes a structure slidable between the first and second positions corresponding to fully open and fully closed positions respectively.

27. The turbine stator of claim 26, further comprising a resilient member coupled to the structure to urge the structure toward the other of the first and second positions when the actuation device is deactivated.

28. A method comprising:
transporting pressurized working fluid to a variable geometry turbine stator;
controlling the pressurized working fluid discharged from the turbine stator, wherein the controlling includes selectively blocking a portion of the flow of working fluid through flow areas formed between static vanes of the stator;
rotatingly driving a turbine with the working fluid;
rotating an engine to a starting speed with the turbine; and
wherein the controlling includes moving a flow blocking member to a desired position between a first position proximate a hub of the stator vanes to a second position proximate the tip of the stator vanes with an actuation cam positioned internal to the turbine stator.

29. The method of claim 28, further comprising sensing a pressure of a working fluid, a temperature of the working fluid and/or the speed of the turbine.

30. The method of claim 29, wherein the controlling is in response to the sensing.

* * * * *